United States Patent [19]

Blackmon et al.

[11] Patent Number: 4,876,317

[45] Date of Patent: Oct. 24, 1989

[54] AMIDE-UREA COPOLYMER AND PROCESS FOR THE PREPARATION THEREOF

[75] Inventors: Kenneth P. Blackmon, Mobile, Ala.; Donald C. Clagett, Pittsfield, Mass.; Daniel W. Fox, Pittsfield, Mass.; Louis M. Maresca, Pittsfield, Mass.; Sheldon J. Shafer, Phoenix, Ariz.

[73] Assignee: General Electric Company, Pittsfield, Mass.

[21] Appl. No.: 139,482

[22] Filed: Dec. 30, 1987

[51] Int. Cl.$^4$ .................... C08G 69/48; C08G 71/02

[52] U.S. Cl. ................... 525/433; 525/420; 528/335; 528/340; 528/347; 528/370

[58] Field of Search ............... 525/433, 420; 528/335, 528/347, 340, 370

[56] References Cited

U.S. PATENT DOCUMENTS

| | | | |
|---|---|---|---|
| 3,534,001 | 10/1970 | Bouboulis et al. | 528/335 |
| 4,567,249 | 1/1988 | Fox et al. | 528/347 |

Primary Examiner—Harold D. Anderson
Attorney, Agent, or Firm—Hedman, Gibson, Costigan & Hoare

[57] ABSTRACT

Copolymers comprising amide units and urea units are prepared by melt phase interchange of diaryl esters of dicarboxylic acids with diamines and diesters of carbonic acid with diamines. The products are tough resins, useful per se as molding compounds, or in blends with other thermoplastic polymers.

7 Claims, No Drawings

AMIDE-UREA COPOLYMER AND PROCESS FOR THE PREPARATION THEREOF

CROSS REFERENCE TO RELATED APPLICATION

This application is related to the following commonly assigned application

| SERIAL NO. | FILING DATE | TITLE | APPLICANTS | STATUS |
|---|---|---|---|---|
| 117,250 | 11/04/87 | COPOLYMERS AND PROCESS FOR THE PREPARATION THEREOF | D. C. Clagett D. W. Fox L. M. Maresca S. J. Shafer | Pending |

FIELD OF THE INVENTION

The present invention relates to copolymer resins, thermoplastic compositions comprising them, and processes useful in their preparation. More particularly, it is concerned with copolymers comprising amide units and urea units, molding compositions comprising such copolymers and a melt phase process for their production by interchange of diaryl esters with diamines.

BACKGROUND OF THE INVENTION

Blends of amorphous polyamides and polyarylates, poly(ester carbonates) or polycarbonates are known to exhibit desirable properties including excellent solvent resistance, ductility and resistance to brittle failure when molded into articles. See, for example, the copending, commonly assigned U.S. patent application of L. M. Maresca, D. C. Claggett and U. S. Wascher, Ser. No. 812,433 filed Dec. 23, 1985. Novel polyamide-polyarylate copolymers have been prepared which have excellent and improved physical and mechanical properties, and good chemical resistance and barrier properties, and these are the subject matter of commonly assigned copending application Ser. No. 117,250, filed Nov. 4, 1987. Such copolymers are prepared in a one or two stage melt polymerization process in which a wide variety of diamines, diphenols and diacid esters can be used. If, for example, diphenyl iso/terephthalate is reacted with a diamine in the melt at, for example, 120° C.-270° C., amide units are produced. If a diphenol such as bisphenol-A is included and a temperature of 220° C.-320° C. is employed arlyate units will also be smoothly produced. Although Fox and Shafer, U.S. Pat. No. 4,567,249, disclose the melt preparation of polyamides by amine-ester interchange, there is no hint or suggestion in that patent to employ both a diamine and a diphenol in the process to obtain polyamide-polyarylate copolymers.

It has now been found that amide-urea copolymers, including random copolymers, block copolymers and alternating copolymers, can be synthesized by a melt polymerization process. If carried out stepwise, in one step a polyamide block can be formed by the reaction of a diamine, e.g., hexamethylenediamine or meta-xylylenediamine, with a diaryl ester, e.g., diphenyl iso/-terephthalate, at temperatures ranging from about 120° to about 270° C. In a separate step, additional diamine and diaryl ester of carbonic acid are added to the reaction to form the polyurea-block at similar temperatures, i.e., more moderate than required to make the polyarylate blocks. Random polyamide-ureas can be conveniently formed in a one step melt polymerization process by reacting a diamine with a diaryl ester such as diphenyl isophthalate and a diaryl ester such as diphenyl carbonate at 120°-270° C. The new materials, which can be made from a wide variety of diamines, have excellent mechanical and physical properties, good chemical resistance and barrier properties.

SUMMARY OF THE INVENTION

According to the present invention, there are provided block copolymers of the general formula

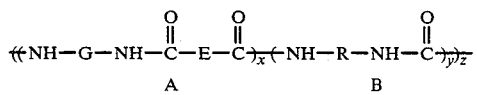

wherein units A comprise from about 1 to about 99 percent by weight of said copolymer and units B comprise from about 99 to about 1 percent by weight of said copolymer, where E is selected from divalent alkyl, aryl, cycloalkyl, arylalkyl and alkylaryl groups of from 2 to 30 carbon atoms or a mixture of any of the foregoing, optionally substituted with at least one chlorine, bromine, fluorine, nitro, nitrile or alkyl of from 1 to 6 carbon atoms, alkoxy of from 1 to 6 carbon atoms or aryl of from 6 to 20 carbon atoms; G is a divalent alkyl, aryl, cycloalkyl, arylalkyl or alkylaryl group of from about 2 to about 30 carbon atoms or a mixture of any of the foregoing, optionally interrupted with alkylene, arylene, carbonyl, ether, imino or sulfur-containing groups, optionally substituted with at least one of chlorine, bromine, fluorine, nitro, nitrile, alkyl or from 1 to 6 carbon atoms, alkoxy of from 1 to 6 carbon atoms or aryl of from 6 to 20 carbon atoms; R is as defined for G; and x, y and z are each integers of from 1 to 100,000.

Preferred copolymers are those wherein units of A comprise from about 20 to about 80 percent by weight and units of B comprise from about 80 to about 20 percent by weight of A and B combined, and especially preferred are copolymers wherein units of A comprise from about 40 to about 60 percent by weight and units of B comprise from about 60 to about 40 percent by weight of A and B combined.

Special mention is made of block copolymers as above defined wherein E is

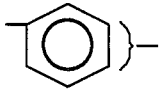

and G and R are divalent alkyl cycloalkyl or alkylaryl of from about 2 to about 20 carbon atoms. Especially preferred are copolymers wherein G and R are residuums of diamines selected from ethylenediamine, trimethylenediamine, tetramethylenediamine, pentamethylenediamine, 2-methylpentamethylenediamine, hexamethylenediamine, isomeric trimethylhexamethylenediamine, meta-xylylenediamine, para-xylylenediamine, 1,3-bis(aminomethyl) cyclohexane, 1,4-bis(aminomethyl)cyclohexane, 1,3-diaminocyclohexane, 1,4-diaminocyclohexane, bis(4-aminocyclohexyl)methane, 2,2-bis(4aminocyclohexyl)propane, 1,4-piperazine, meta-phenylenediamine, para-phenylenediamine, bis(4-aminophenyl)methane and the like or mixtures thereof.

Also provided by the present invention is a process to make the copolymers above defined, said process comprising heating a mixture of at least one diaryl ester of a dicarboxylic acid of the formula

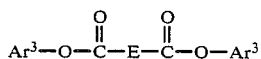

wherein the groups $Ar^3$ represent the same or different aryl groups, optionally substituted with at least one of chlorine, bromine, fluorine, nitro, nitrile, alkyl of from 1 to 6 carbon atoms, alkoxy of from 1 to 6 carbon atoms or aryl of from 6 to 20 carbon atoms, and E is as above defined; a diamine of the formula

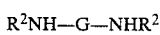

wherein G is as above defined and $R^2$ is hydrogen or alkyl of from 1 to 10 carbon atoms, a diamine of the formula

wherein R and $R^2$ are as above defined; and a diester of carbonic acid of the formula

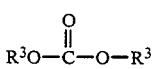

wherein $R^3$ is alkyl of from 1 to 12 carbon atoms or a group as defined for $Ar^3$ above until formation of said copolymer is substantially complete.

This process can be carried out in one or two stages depending on the structure of the final copolymer desired. For example, carrying out the process in one stage with all components mixed produces a random copolymer in which x, y and z have no consistently recurring values. If, however, essentially stoichiometric amounts of the desired ester of a dicarboxylic acid and a diamine are reacted in the first stage followed by further polymerization in a second stage with essentially stoichiometric amounts of a diamine and a diester of carbonic acid then a block copolymer is formed wherein x and y are consistently greater than about 15. In a third variation, if 2 equivalents of a diamine are reacted with a diester of a dicarboxylic acid in step one then very small nylon oligomers are formed. Addition of a diester of carbonic acid in a second step results in the formation of an essentially alternating amide-urea copolymer. Values of x and y are essentially less than about 5. In all cases the total concentration of the diamines must be essentially equal to the combined concentrations of the diester of the dicarboxylic acid and the diester of carbonic acid.

Preferably, the diaryl ester comprises a diaryl terephthalate, a diaryl isophthalate, a diaryl adipate or a mixture thereof. Especially preferably, the diaryl ester will comprise diphenyl isophthalate, diphenyl terephthalate or diphenyl adipate. Preferably also, the diamine comprises ethylenediamine, trimethylenediamine, tetramethylenediamine, pentamethylenediamine, 2-methylpentamethylenediamine, hexamethylenediamine, isomeric trimethylhexamethylenediamine, meta-xylylenediamine, para-xylylenediamine, 1,3-bis-(aminomethyl)cyclohexane, 1,4-bis(aminomethyl)cyclohexane, 1,3-diaminocyclohexane, 1,4-diaminocyclohexane, bis(4-aminocyclohexyl)methane, 2,2-bis(4-aminocyclohexyl)propane, 1,4-piperazine, meta-phenylenediamine, para-phenylenediamine, bis(4-aminophenyl)methane and the like or mixtures thereof. Diphenyl carbonate is also preferred.

Also among the preferred features of the invention are copolymers prepared in a melt phase process by the interchange of a diamine and a diaryl ester to produce a polyamide having amine or ester terminal groups and further reacting the polyamide with a diamine and a diester of carbonic acid to form a polyamide-polyurea block copolymer containing from about 1 to about 99 percent by weight of polyamide segments and from about 99 to about 1 percent by weight of polyurea segments. In these, preferably, the diamine comprises a diprimary or disecondary amine. In another preferred feature of the invention, the diaryl ester, the diamine and the diester of carbonic acid may be reacted in a one-step process in order to produce a random copolymer.

The copolymers are thermoformable into shaped articles which are tough, thermally stable and resistant to hydrolysis. They are also useful as blending resins.

DETAILED DESCRIPTION OF THE INVENTION

As examples of diamines particularly suitable for use in preparing the A units can be diprimary or disecondary as well as mixed primary and secondary diamines of the general formula shown above. Illustrative examples are ethylenediamine, trimethylenediamine, tetramethylenediamine, pentamethylenediamine, 2-methylpentamethylenediamine, hexamethylenediamine, isomeric trimethylhexamethylenediamine, meta-xylylenediamine, para-xylylenediamine, 1,3-bis(aminomethyl)cyclohexane, 1,4-bis(aminomethyl)cyclohexane, 1,3-diaminocyclohexane, 1,4-diaminocyclohexane, bis(4-aminocyclohexyl)methane, 2,2-bis(4-aminocyclohexyl)propane, 1,4-piperazine, meta-phenylenediamine, para-phenylenediamine, bis(4-aminophenyl)methane and the like or mixtures thereof.

Illustratively useful diesters suitable as sources for structural units E are esters of dicarboxylic acids such as diphenylic esters derived from phenolic compounds, e.g., a monohydric phenol, including phenol itself, and alkyl- or halo-substituted phenols, such as o-, m- and p-cresols, and o- and p-chlorophenol and the like, and a dicarboxylic acid, such as adipic, sebacic, azelaic, glutaric, phthalic, terephthalic, isophthalic, naphthalene dicarboxylic, biphenyl dicarboxylic acid, and the like. A preferred family of diesters comprises the diphenyl esters of terephthalic acid, isophthalic acid, and mixtures thereof. In general, any diester of an aliphatic or aromatic dicarboxylic acid conventionally used in the preparation for polyesters, may be used for the preparation of the copolymers described above. The esters of aliphatic or aromatic dicarboxylic acids which are used may also include those of aliphatic-aromatic carboxylic acids, in addition to those of wholly aliphatic or aromatic dicarboxylic acids.

With respect to the urea unit B, these are derived from the reaction of diamines with a diester of carbonic acid. The illustrative examples of diamines particularly suitable for use in preparing the A units are similarly suitable for use in preparing the B units.

The diesters of carbonic acid are represented by the general formula:

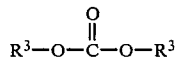

wherein $R^3$ is as defined above. For purposes of the present invention, $R^3$ is an aliphatic or cycloaliphatic radical, such as methyl, ethyl, n-propyl, dodecyl, octadecyl or an aromatic radical such as phenylene, biphenylene, naphthylene, substituted phenylene, etc. Typical of the carbonate esters are diphenyl carbonate, di(-halophenyl)carbonates such as di(chlorophenyl)carbonate, di(bromophenyl)carbonate, di(trichlorophenyl)carbonate, di(tribromophenyl)carbonate, etc., di(alkylphenyl)carbonates such as di(tolyl)carbonate, di(naphthyl)carbonate, di(chloronaphthyl)carbonate, phenyltolyl carbonate, chloronaphthyl chlorophenyl carbonate, and the like. The preferred diaryl carbonate is diphenyl carbonate.

In general, the process of the invention is carried out by charging a mixture of the calculated amount of the diaryl esters, the diaryl carbonate and diamines into a reactor and heating the reactants until all are melted. The ester-carbonate-amine interchange reaction occurs smoothly and rapidly at temperatures in the range of from about 120° C. to about 270° C. to produce the amide units A and urea units B. The resulting copolymer can be recovered in any convenient manner, remaining, for example, as a residue after vacuum devolatilization, or by precipitation from a solvent by means of an antisolvent, such as methanol.

The products of the process may be molded in any desired shape and are useful as structural and engineering materials to replace metal parts, in automotive applications, electrical appliances, and in food wrappings, as stand along resins, in blends with other resins such as polyesters, polyarylates, polycarbonates, polyureas and nylons and as tie resins to bond two different resin layers.

DESCRIPTION OF THE PREFERRED EMBODIMENTS

The following examples illustrate the invention. They are not be construed to limit the claims in any manner whatsoever.

EXAMPLE 1

Nylon/Polurea Block Copolymers

Nylon/polyurea block copolymers are prepared in a two-step ester-amine interchange melt polymerization process. The first step involves the production of an amine-terminated nylon, while the second step involves the addition of the poly-urea forming monomers. For example, 39.79 g (0.125 mol) of diphenyl isophthalate (DPI) and 15.11 g (0.130 mol) of hexamethylenediamine (HMDA) are charged to a 250 ml, 3-neck flask equipped with a mechanical stirrer and nitrogen inlet. The flask is placed in a 180° C. oil bath for 1.5 hours and then cooled to room temperature. Subsequently, 26.78 g (0.125 mol) of diphenyl carbonate (DPC) is added, followed by the slow addition of 13.95 g (0.120 mol) of HMDA at 180° C. The reaction is allowed to continue for about 1 hour after the addition was completed. The resulting resin exhibits a Tg of 100° C. (nylon block), a Tc (crystallization temperature) of 160° C., and a Tm of 277° C. (polyurea block). The IV of the resin, as measured in phenol/tetrachloroethane, is 1.87 dl/g.

EXAMPLE 2

Polyamide-ureas Random Copolymers

Polyamide-ureas are conveniently prepared in a one-step esteramine interchange melt polymerization process by reacting one or mole diamines with a diaryl ester of a dicarboxylic acid and diphenyl carbonate. For example, 55.71 g (0.175 mol) of diphenyl isophthalate (DPI) 16.07 g (0.075 mol) of diphenyl carbonate (DPC) and 29.05 (0.25 mol) of hexamethylenediamine (HMDA) were charged to a 250 ml, 3-neck flask equipped with a mechanical stirrer and nitrogen inlet under a nitrogen atmosphere and the flask is placed in a 180° C. oil bath for about 1 hour. The resulting polyamide-urea resin is transparent with a Tg of 110° C. and an IV of 1.13 dl/g (measured in phenol/TCE). It should be noted that a wide variety of diamines may be used in place of, or in conjunction with, HMDA; also, other diaryl esters and carbonate contributing monomers, in any proportions, may be used.

EXAMPLES 3-12

The procedure described in Example 2 is repeated except that various diamines are used and the amide/urea ratio is varied. The products and their properties are summarized in Table 1.

TABLE 1

| Example | Diamine ($HN_2-R-NH_2$) R-Group | Amide:Urea Linkages | IV (dl/g) | Tg (°C.) |
|---|---|---|---|---|
| 3 | $-(CH_2)_6-$ | 90:10 | 1.77 | 118 |
| 4 | $-(CH_2)_6-$ | 80:20 | 1.08 | 116 |
| 5 | $-(CH_2)_6-$ | 70:30 | 1.13 | 110 |
| 6 | $-(CH_2)_6-$ | 50:50 | 1.77 | — |
| 7 | $-(CH_2)_6-$ | 30:70 | 2.08 | — |
| 8 | $-(CH_2)_6-$ | 10:90 | 1.65 | — |
| 9 | 50% $-(CH_2)_6-$ 50%  | 50:50 | — | 115 |
| 10 |  | 80:20 | 0.90 | 164 |
| 11 | 50% $(CH_2)_6-$ 50% $(CH_2)_3$ | 80:20 | 0.81 | 127 |
| 12 |  | 75:25 | 0.90 | 143 |

EXAMPLE 13

The procedure described in Example 1 is repeated except that 2 equivalents of hexamethylenediamine are reacted with diphenyl isophthalate in step 1. One equivalent of diphenyl carbonate is added in step 2. An essentially alternating amide urea copolymer in accordance with this invention is produced.

The copolymers are useful per se as molding and film-forming resins, and as blending resins with other thermoplastic polymers.

The above-mentioned patents, patent applications and publications are incorporated herein by reference.

Many variations of this invention will suggest themselves to those skilled in this art in light of the above detailed description. For example, instead of diphenyl isophthalate and diphenyl terephthalate, the following diaryl esters can be used: diphenyl adipate, diphenyl sebacate, diphenyl glutarate, diphenyl naphthalene dicarboxylate, diphenyl biphenyl dicarboxylate, mixtures of any of the foregoing, and the like. Instead of hexamethylenediamine and the other diamines used, the following may be substituted: ethylenediamine, trimethylenediamine, tetramethylenediamine, pentamethylenediamine, 2-methylpentamethylenediamine, isomeric trimethylhexamethylenediamine, meta-xylylenediamine, para-xyxylenediamine, 1,3-bis(aminomethyl)cyclohexane, 1,4-bis(aminomethyl)cyclohexane, 1,3-diaminocyclohexane, 1,4-diaminocyclohexane, bis(4-aminocyclohexyl)methane, 2,2-bis(4-aminocyclohexyl)propane, 1,4-piperazine, meta-phenylenediamine, para-phenylenediamine, bis(4-aminophenyl)methane and the like or mixtures thereof. All such obvious variations are within the full intended scope of the appended claims.

We claim:

1. A block copolymer having recurring units of the general formula:

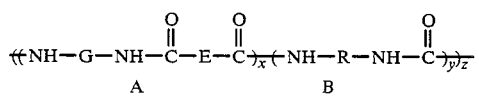
$$\{(NH-G-NH-\overset{O}{\underset{A}{C}}-E-\overset{O}{C})_x(NH-R-NH-\overset{O}{\underset{B}{C}})_y\}_z$$

comprising segments of repeating units A and segments of repeating units B wherein units A comprise from about 1 to about 99 percent by weight of said copolymer and units B comprise from about 99 to about 1 percent by weight of said copolymer, where E is selected from (1) divalent alkylene, arylene, cycloalkylene, arylalkylene, alkylarylene groups of from 2 to 30 carbon atoms or a mixture of any of the foregoing, or (2) substituted with at least one chlorine, bromine, fluorine, nitro, nitrile, alkylene of from 1 to 6 carbon atoms, alkoxy of from 1 to 6 carbon atoms or aryl of from 6 to 20 carbon atoms; G is selected from (1) divalent alkylene, arylene, cycloalkylene, arylalkylene or alkylarylene groups of from about 2 to about 30 carbon atoms or a mixture of any of the foregoing, or (2) interrupted with alkylene, arylene, carbonyl, ether, imino or sulfur-containing groups, or (3) interrupted with alkylene, arylene, carbonyl, ether, imino or sulfur-containing groups substituted with at least one of chlorine, bromine, flourine, nitro, nitrile, alkylene of from 1 to 6 carbon atoms, alkoxy of from 1 to 6 carbon atoms or arylene of from 6 to 20 carbon atoms; R is as defined for G and x, y and z are each integers of 1 to 100,000.

2. A copolymer as defined in claim 1 which is an alternating copolymer.

3. A block copolymer prepared in a melt phase process by the interchange of a diamine and a diaryl ester to produce a polyamide having amide or ester terminal groups and further interchanging the polyamide with a diamine and a diester of carbonic acid to form a polyamide polyurea block copolymer containing from about 1 to 99 percent by weight of polyamide segments and from about 99 to about 1 percent by weight of polyurea segments.

4. A block copolymer as defined in claim 3 wherein the diaryl ester comprises diphenyl isophthalate, diphenyl terephthalate, diphenyl adipate or a mixture of any of the foregoing.

5. A block copolymer as defined in claim 3 wherein the diester of carbonic acid comprises diphenyl carbonate.

6. A block copolymer as defined in claim 3 wherein the diamine comprises hexamethylenediamine.

7. A block copolymer as defined in claim 3 wherein said diamines comprise ethylenediamine, trimethylenediamine, tetramethylenediamine, pentamethylenediamine, 2-methylpentamethylenediamine, hexamethylenediamine, isomeric trimethylhexamethylenediamine, meta-xylylenediamine, para-xylylenediamine, 1,3-bis(aminomethyl)cyclohexane, 1,4-bis(aminomethyl)cyclohexane, 1,3-diaminocyclohexane, 1,4-diaminocyclohexane, bis(4-aminocyclohexyl)methane, 2,2-bis(4aminocyclohexyl)propane, 1,4-piperazine, meta-phenylenediamine, para-phenylenediamine, bis(4-aminophenyl)methane or mixtures thereof.

* * * * *